March 5, 1935.          J. A. WELLS          1,993,497
METHOD AND MEANS FOR REPORTING INTERFERENCE WITH VEHICLES
Filed Sept. 28, 1932
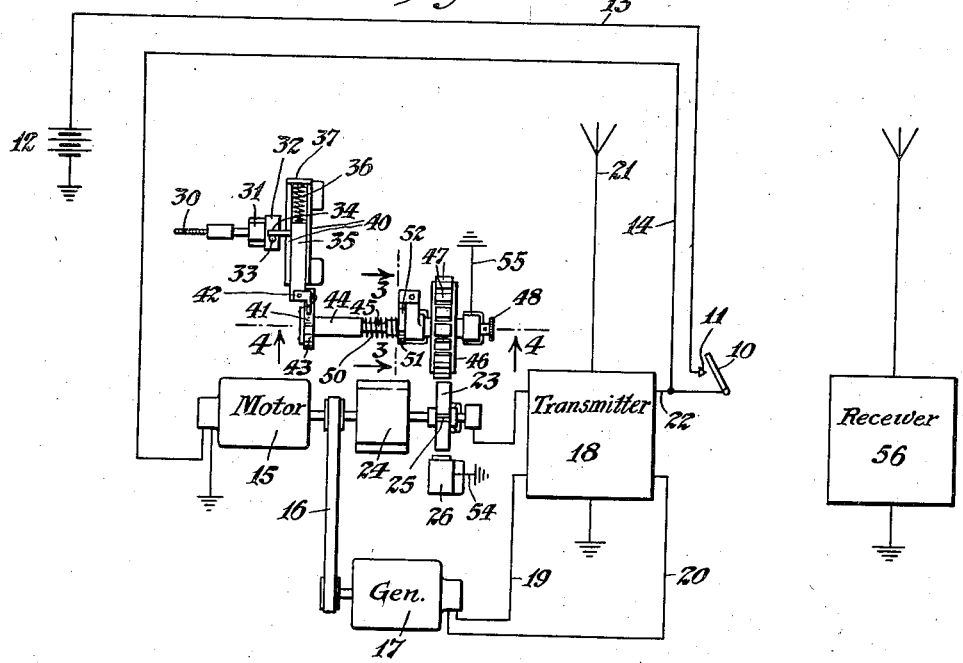
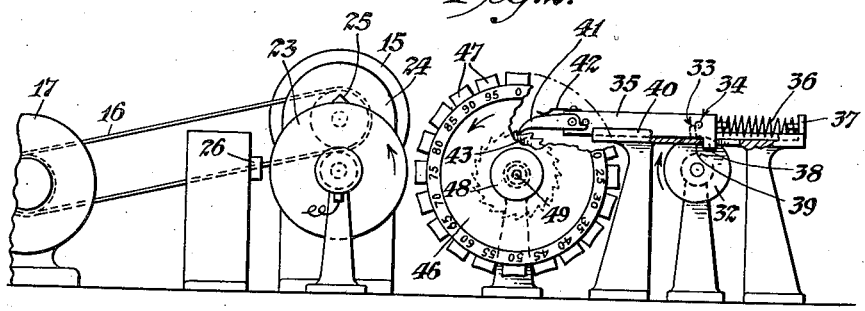
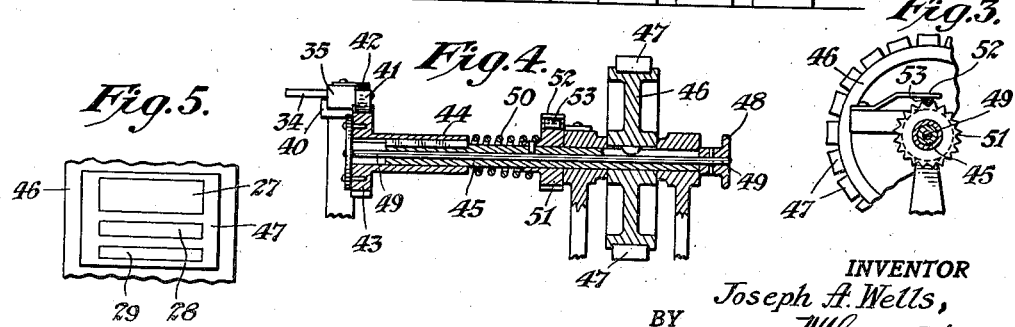
INVENTOR
Joseph A. Wells,
BY
HIS ATTORNEY.

Patented Mar. 5, 1935

1,993,497

UNITED STATES PATENT OFFICE 1,993,497

METHOD AND MEANS FOR REPORTING INTERFERENCE WITH VEHICLES

Joseph A. Wells, Montclair, N. J.

Application September 28, 1932, Serial No. 635,225

8 Claims. (Cl. 250—2)

This invention relates to a method and apparatus for giving increased protection to motor trucks and the like against holdups and other trouble and has for its object to provide a simple and inexpensive device of this character which is automatic in operation. Another object is to automatically indicate not only the particular truck which is in trouble or held up, but also automatically indicate the approximate location of a vehicle so that assistance may be more readily and quickly dispatched. Truck loads of silks and other valuable goods have been so frequently held up that the loss has annually reached an astonishingly large figure. This invention contemplates the reduction of such losses by providing increased protection against successful completion of the crime.

According to this invention an automatic radio transmitter may be started in operation by the by the driver's foot when a truck is held up. The number or code signal characteristic of the particular vehicle is emitted for reception by a central office tuned to the wave length of the transmitter on the truck so that upon knowing which one of a fleet of trucks is in trouble, police or other assistance may be rapidly dispatched while the central office will be provided with the schedule of the various trucks, their time of departure and route and destination; the distance travelled by a truck may also be included in the automatic transmitting of a message.

Referring to the drawing

Figure 1 represents one embodiment of this invention;

Fig. 2 is a side view of the motor and mechanically moving elements of the device shown in Fig. 1;

Fig. 3 is a section on the line 3—3 of Fig. 1;

Fig. 4 is a section on the line 4—4 of Fig. 1; and

Fig. 5 shows the contact face of one of the relatively stationary switch members which is engaged by the rotary switch member in automatically transmitting a message.

The movable switch member 10, as shown in Fig. 1, may be a pedal or pedal operated and located adjacent the feet of the driver of the truck. This switch is normally open and when closed by the driver's foot engages the contact member 11, thereby closing an electric circuit from the battery 12 through one side of the line 13, the closed switch members 10 and 11 and the line 14 to the motor 15. From the motor the other side of the line is grounded as is also the battery. The battery 12 may be the usual starting battery carried by the truck or may be some additional battery suitable for operating the motor 15. Upon closing the circuit through the switch members 10 and 11, the motor 15 starts up, driving the generator 17 through the belt 16, the generator 17 being of the sort designed for supplying sufficiently high potential current to operate the usual radio transmitting apparatus 18. Of course, if desired, instead of a generator 17, suitable voltage for the radio transmitter might be obtained from a battery or other source of current as has been customary in portable radio transmitters. Instead of breaking the high potential circuit from the generator through the wires 19 or 20 by some automatic message transmitting circuit interrupter, it is preferred to break the generator circuit by means of a relay as is customary and not herein specifically shown, the relay being located within the transmitter 18 and operated by the battery current through the line 22. The transmitter may be provided with some convenient type of antenna 21 located in the roof of the truck or elsewhere.

The make and break apparatus for automatically transmitting the radio message contemplates a rotatable circuit interrupter 23 provided with a contact 25 driven by the motor through suitable reduction gearing 24. The rotary switch or contact element 25 passes over one or more stationary contact elements 26. The face of the stationary contact element 26 may comprise one or more conductor bars of different lengths or shapes, for example, the contact face of the member 26 might be of the type illustrated in Fig. 5 in which the conducting segment 27, when passed over by the moving contact 25, would transmit a dash and then the two conducting elements 28 and 29 would transmit two dots, since these several conducting members are separated by insulating material. Of course, any danger of arcing may be reduced by the provision of a shunted condenser or other commonly used means for suppressing an arc. As the movable contact member 25 rotates, it will be seen that each time this member passes across the face of the stationary contact member 26, the circuit will be made and broken and the radio message sent out. The message depends on the construction of the face of the stationary contact member 26 and in the embodiment illustrated, this stationary contact member 26 may be used to send out a message characteristic of the particular truck. In other words, a different arrangement of dots and dashes may be used on each truck so that the signal will be either a number, indicating the number of the truck, or else some code signal characteristic of a particular truck. The stationary conductor segments 27, 28 and 29 are each connected to the ground illustrated, so that current may thence flow back to the grounded side of the battery 12.

In addition to the signal characteristic of the vehicle, the illustrated embodiment contemplates transmission of another signal responsive to the distance the vehicle has travelled and driven by an odometer or its equivalent. The flexible shaft 30 may be connected to a wheel or otherwise as is common for speedometer or odometer connections. The reduction gearing customary in an odometer may be located adjacent the bearing 31 or in some other convenient position. From the reduction gearing, a wheel 32 may be driven and, in the embodiment illustrated, it is contemplated that the wheel 32 shall make one revolution for every five miles the vehicle has travelled. Of course, the distance to be travelled for one revolution of the wheel 32 will depend upon the length of the truck route and if the truck is only to go a comparatively few miles, it would be better to have the wheel rotate once for one mile or once for some particular fraction of a mile. On the periphery of the wheel 32 is a pin 33 which, in rotating, engages a pin 34 projecting from the reciprocal member 35 which moves in one direction under the influence of the spring 26 and in the opposite direction by the pin 33. The spring 26 engages a stationary abutment on one side and the slidable member 35 on the other. A downward projection 38 on the member 35 limits its motion to the left in Fig. 2 by co-operation with the stationary abutment 39. Suitable guideways 40 limit the movement of the member 35 to substantially straight line reciprocations. Upon the outer end of the member 35 is carried a pawl 41 which is pressed downwardly by the leaf spring 42 for engagement with the ratchet wheel 43 mounted upon the shaft 44. This shaft 44 is keyed to the inner shaft 45 and the wheel 46 is also keyed on the shaft 45. Around the periphery of the wheel 46 are carried contact blocks of a construction somewhat similar to that of the stationary contact 26, except, of course, that the arrangement of segments on each block will be different so that a different dot and dash signal will be transmitted when the movable contact 25 passes one of the block faces 47 from that which is transmitted when another block face is presented for contact with the movable member 25. In the embodiment illustrated in Fig. 2, the vehicle has travelled 75 miles and that particular block face 47 is presented for co-operation with the moving contact member 25. Here again the segments may be so arranged as to emit dot and dash signals giving the actual mileage or else a code signal indicative of the travel of the vehicle either in linear units or in fractions of its route.

The mechanism just described insures that some one of the block faces 47 will be always presented for co-operation with the moving contact 25, except during that short time, almost instantaneously, during which the wheel 46 advances the space of one ratchet tooth under the influence of the slidable member 35. As soon as the pin 34 is released from contact with the rotary pin 33, the spring 36 moves the member 35 to the left in Fig. 2 and rotates the ratchet 43 an angular distance equal to that of one tooth. In this way there is substantially no danger of the wheel 46 stopping in a mid-position with not one of its face blocks 47 in position for co-operation with the moving contact 25.

In order to re-set the wheel 46 to zero position upon completion of a trip, there is provided a knob 48, shown in Fig. 4, as being affixed to a central rod 49, so that upon pulling out the knob 48 to the right in Fig. 4, the ratchet is moved out from under its pawl 41 and both the ratchet and the wheel 46 may then be turned by hand until in the correct angular position for starting another trip. Upon release of the knob 48, the spring 50 forces the ratchet wheel 43 back into co-operation with its pawl 41, one side of said spring 50 engaging the slidable shaft 44, while the other end of the spring 50 co-operates with the non-slidable abutment illustrated by the wheel 51. As shown in Fig. 3, the wheel 51 is provided with teeth of the general shape illustrated for co-operation with the wedged shape element 53 carried by the leaf spring 52. This detent wheel thus is revolved either manually by the knob 48 or automatically by each motion of the reciprocating member 35, so that the correct position for the wheel 46 is insured in order that its co-operative face block 47 may be in the correct angular position to engage the contact 25. The circuit through the contact segments of each face block is through the wheel 46 and the frame of the machine to the ground 55 and then back to the battery 12.

The receiver 56 may be of some convenient and well known type. The message may be received audibly by a listening operator continually in attendance, or the message may be received upon a printed or perforated tape for purposes of preservation and record, if desired. The receiving operator in the central station is provided with maps indicating the route of each truck in the fleet to be protected and is also supplied with information concerning the time of departure and expected arrival of each truck, so that as soon as he learns any particular truck is in difficulty, he will be able to tell approximately where that particular truck should be found and he can immediately communicate with the police or with the protective organization's own trouble crew to dispatch assistance as quickly as possible. If the route of some of the trucks is of considerable distance, he may be able, by long distance telephone, to communicate with the nearest police station. As soon as a message has been received by the central station indicating that a particular truck is in trouble, no additional information should be needed. However, due to the possibility of traffic and other delays causing a truck to be considerably off its schedule, it may be desirable to have the central station also receive a message indicating how far the truck, which is in trouble, has travelled, or how many units its route have been passed over. It is for this reason that the received signal has been described as including a portion responsive to the distance the truck has travelled. Preferably the stationary contact member 26 should be located in some other position than directly opposite the distance responsive contact member in order that the unequal displacement and time between the two portions of the signal, that is while the movable contact 25 is moving from one to the other, may indicate which portion of the signal is the vehicle number and which portion is the distance. For example, if the stationary contact member 25 is located beneath the axis of the wheel 23, then with the direction of rotation shown by the arrow in Fig. 2, the operator at the central station receiving the message will know that the first portion of the message is the number of the truck and that the second portion is the distance the truck has travelled and be able to identify which portion is which when there is a much longer pause between one part of the message and another. It may be desirable to provide special odometer parts adapted for each trip, that is when a truck has taken a long trip, such as about 100 miles, one type of odometer element may be used so that each movement of the wheel 46 may indicate 5% of the total journey and on the other hand, if the route is much shorter, say 5 miles, a different part may be substituted so that the wheel 46 may still indicate 1/20 or 5% of the distance. Of course, the odometer responsive message may also state the actual mileage.

In operation, when the truck has been held up, the driver rising with his hands in the air, can close the switch member 10, starting the motor 15 and the generator 17 and thus automatically emitting signals by radio which identify the number of the vehicle and its location. Preferably, radio messages are repeated continually until either the battery has run down or the trouble is over, when the movable switch member 10 may be manually opened. If desired, another switch may be provided in the battery circuit for cutting out the motor and transmitter manually or such cut-out switch may be time controlled and adapted to operate after the signals have been sent out for say 5 minutes. The provision of such a time controlled cut-out switch would safeguard the battery from being run down and better enable the vehicle to start if the same battery is being used for starting the vehicle motor.

Instead of the switch 10 having only one position as shown in Fig. 1, it may be provided with two positions, so that in one position the motor and generator, if started, and the messages sent out, would include only the vehicle number, or in other words, in this position of the switch member 10, the circuit could be opened through the ground connection 55 in order that the distance responsive portion of the emitted signal would not be presented. The reception of such a signal by the central office might indicate mechanical trouble and not the acute difficulty that might be offered by reception of the signal including both portions. A further modification contemplates a further position for the switch member 10, such that either portion of the signal may be cut into circuit. That is, in one position a circuit may be completed through the contact 28 and the ground 54, whereas in another position the circuit may be completed through the contact 25 and the ground 55. In this way the driver might use the switch to first send out a message giving the truck number and then later move the switch member 10 to another position for sending out a message giving the mileage or distance the truck had travelled. A modification, such as this last, would prove of substantial advantage to the central office in keeping advised of the location of each truck. By having the driver's watch synchronized, the driver of No. 1 truck could be required to report his position any hour on the hour, and driver of truck No. 2 would report his position every hour at 5 min. after the hour and so on. It might be well to equip each truck with a receiver also, so that two-way communications might be established and the driver receive a message from the central station advising him of road difficulties ahead and the necessity of taking some detour. Such a receiver on the truck need not be of the type requiring the driver to have ear phone continually in position, but might be of the type which would first give a visible or audible signal and then enable the driver to receive the message from the central office. After receiving such a message, the driver might close his switch of the transmitter control so as to only give a message identifying his location and then his number in sequence different from that in which the signal is received at the central office if given automatically.

In lieu of requiring the driver to report his position at stated intervals of time, as above specified, the mechanism itself could be so adjusted as to accomplish the automatic periodic transmission of a characteristic signal peculiar to the particular vehicle at fixed intervals, and in the event of a hold-up, instead of the switch 10 being closed, it would be open by the positive action of the driver, thus interrupting the transmission of the periodic signals and thereby the home office would be apprised of trouble and also could ascertain from the last signal received, the approximate mileage that had been covered, thus enabling it to rush assistance to the vehicle at a location somewhere beyond that from which the last signal had been transmitted.

While my invention is peculiarly adapted for employment on road vehicles, it may also be employed on railway rolling stock for the purpose of periodically reporting the position of passenger trains or freight trains en route and thereby the location of a particular train at certain intervals could be indicated either automatically or manually by a member of the train crew without necessitating the sending of a message upon arrival at a particular station, as is frequently the case under present conditions.

Various modifications from the construction hereinbefore specified may be made without departing from the spirit of my invention as embraced within the scope of the appended claims.

What I claim and desire to obtain by United States Letters Patent is:

1. The combination with a vehicle, of a radio transmitter carried thereby, an odometer carried by said vehicle which is responsive to the distance travelled by said vehicle; means, responsive to a manually controlled switch, for automatically and repeatedly transmitting a radio message, means responsive to the odometer for controlling at least a portion of the transmitted message in accordance with the total distance travelled by the vehicle from a selected starting point, and means for resetting said distance-responsive means at will.

2. The combination with a vehicle, of a radio transmitter carried thereby, means responsive to a manually controlled switch for automatically and repeatedly transmitting a radio message, said means comprising a motor, a switch member actuated by the motor, a co-operative stationary switch member, a second co-operative stationary switch member which is adjusted in response to the distance travelled by the vehicle and a releasable latching mechanism for said adjustable switch member adapted to release said adjustable switch member to enable the same to be adjusted independently of the vehicle travel.

3. The combination with a motor vehicle, including a driving motor and a driver's seat, of means for automatically transmitting a radio signal, an odometer carried by said vehicle which is responsive to the distance travelled thereby, motor-driven means for automatically operating said transmitting means independently of the vehicle motor and means for starting said motor-driven means, said starting means comprising a switch located adjacent the seat of the driver of said vehicle and an actuating means therefor; and said automatic signal transmitting means including an element that is responsive to said odometer in accordance with the elapsed distance the vehicle has travelled as indicated thereby.

4. Means for transmitting a radio signal from a vehicle which comprises means for automatically emitting a signal characteristic of the vehicle, means for automatically emitting a signal indicative of the position of the vehicle and means for connecting each of said foregoing means so that each signal maintains a fixed time sequence from the other in repetition thereof.

5. The combination with a vehicle, of a radio transmitter carried thereby, a mechanism for automatically repeating a signal by said transmitter, a motor for operating said mechanism, said mechanism including a movable part and two parts which are fixed with respect to the movable part, one of said fixed parts controlling a portion of the emitted signal and the other of said fixed parts being adjustable in response to an odometer to control another portion of the emitted signal.

6. The combination with a motor vehicle, of means for transmitting a radio signal, motor driven means for automatically operating said transmitting means independently of the vehicle motor and means for starting said motor driven means, said starting means comprising a switch and an actuating means therefor located adjacent the seat of the driver of the vehicle, said switch having at least two closed positions, in one of which an additional signal is automatically repeated between emission of the first signal.

7. The method of radio signalling from a vehicle, which comprises automatically sending out a repeating signal and then changing said repeated signal by adding another repeating signal in fixed time sequence to the first.

8. The method of reporting the approximate location of a vehicle en route, which comprises effecting the transmission from such a vehicle of different characteristic signals at successive intervals corresponding to the period of time that the vehicle has consumed in travelling a selected unit of distance and receiving and translating the signals so received at a central radio receiving station and determining the approximate location of said vehicle according to the character of the signal so transmitted.

JOSEPH A. WELLS.